United States Patent [19]

Pires et al.

[11] Patent Number: 5,647,628
[45] Date of Patent: Jul. 15, 1997

[54] LINEAR ONE WAY MOVEMENT DEVICE AND PASSENGER SEAT ASSEMBLY USING THE DEVICE

[75] Inventors: Paul B. Pires, Ben Lomond; Wayne K. Higashi, Los Gatos, both of Calif.

[73] Assignee: Epilogics, Inc., Los Gatos, Calif.

[21] Appl. No.: 438,617

[22] Filed: May 10, 1995

[51] Int. Cl.$^6$ ............................... F16F 9/36; B60R 21/00
[52] U.S. Cl. ........................................ 296/68.1; 188/82.7
[58] Field of Search ........................... 296/68.1, 65.1; 297/216.16, 216.18; 188/82.7

[56] References Cited

U.S. PATENT DOCUMENTS

| | | | |
|---|---|---|---|
| 2,886,145 | 5/1959 | Vaught et al. | 188/196 B |
| 3,288,254 | 11/1966 | Repologle | 188/82.7 X |
| 3,917,020 | 11/1975 | Saab | 298/68.1 X |
| 3,998,291 | 12/1976 | Davis | 296/68.1 X |
| 5,070,978 | 12/1991 | Pires | 192/45.1 |
| 5,226,342 | 7/1993 | Panin | 188/82.7 X |
| 5,325,790 | 7/1994 | Drayer | 188/82.7 X |
| 5,538,117 | 7/1996 | Bouchez | 296/68.1 X |

Primary Examiner—Joseph D. Pape
Attorney, Agent, or Firm—Stephen C. Shear

[57] ABSTRACT

A specifically configured linear one-way movement device includes first and second members defining respective first and second linearly extending planar surfaces and a coupling arrangement comprised of a series of linearly spaced first pockets in the first planar surface of the first member, a series of linearly spaced second pockets in the second planar surface of the second member and a plurality of struts, all of which cooperate with one another for allowing the first and second members to telescopically move to an extended position with respect to one another from a contracted position while at the same time preventing the members from telescopically moving back to the contracted position once it has moved to the extended position. This linear one-way movement device forms part of an overall passenger seat assembly for use in a moving vehicle but is especially suitable for use in limiting the abrupt movement of any object, not just a moving vehicle, as a result of and in response to a sudden cessation in the normal forward movement of the object caused by, for example, a head-on collision between, for example, a vehicle, carrying that object and another object, for example, another vehicle.

19 Claims, 2 Drawing Sheets

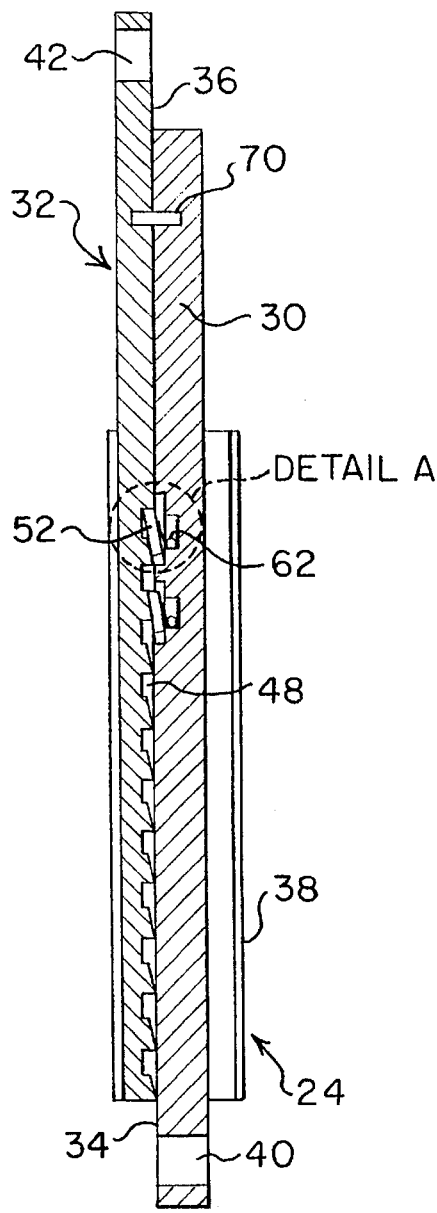
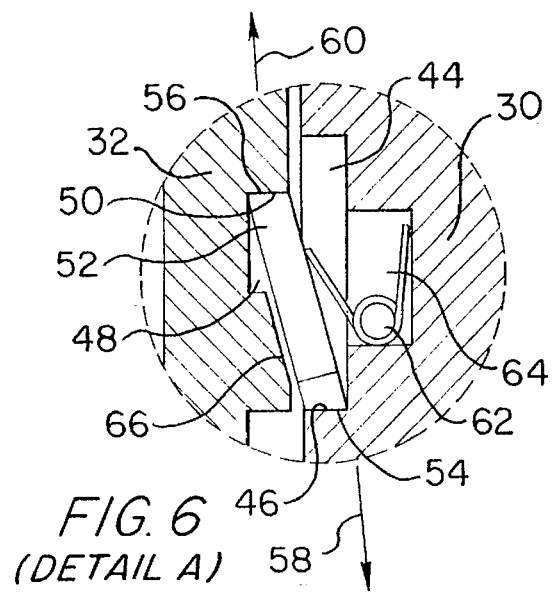
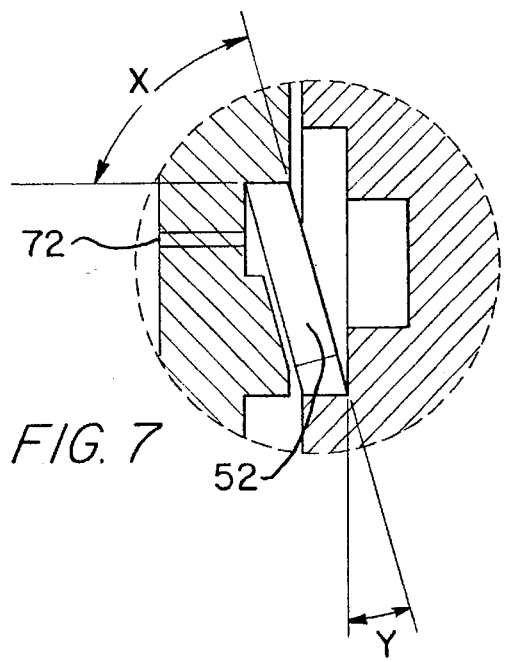
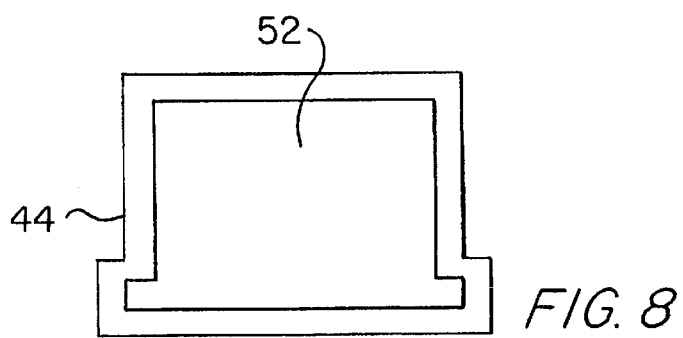
FIG. 5
FIG. 6 (DETAIL A)
FIG. 7
FIG. 8

LINEAR ONE WAY MOVEMENT DEVICE AND PASSENGER SEAT ASSEMBLY USING THE DEVICE

BACKGROUND OF THE INVENTION

The present invention relates generally to one-way movement devices and more particularly to a specifically configured linear one-way movement device which is especially suitable for use in limiting the abrupt movement of an object, for example, a seat assembly, as a result of and in response to a sudden cessation in the normal forward movement of the object. This cessation of forward movement can be caused by, for example, a head-on collision between means, for example, a vehicle carrying the seat assembly, and another object, for example, another vehicle. The present invention also particularly relates to a passenger seat assembly for use in a moving vehicle, specifically a passenger seat assembly which uses the linear one-way movement device disclosed herein.

It is well know that when there is a sudden cessation in the normal forward movement of an automobile or other such passenger vehicle caused by, for example, a head-on collision between the vehicle and another object, for example, another vehicle, the seats within the vehicle and the occupants within those seats may be subjected to a rapid succession of back and forth (forward and rearward) movement, thereby possibly subjecting the occupants to whiplash. One way to reduce the effects of whiplash is to limit this abrupt movement to the initial forward movement of each seat by preventing the seat from moving again once it has initially moved forward as a result of the collision.

This idea generally is not new. However, as will be described in detail hereinafter, the present invention utilizes a unique linear one-way movement device for limiting each seat to the initial forward movement in response to a sudden cessation in the normal forward movement of the vehicle. This linear one-way movement device is modeled after a one-way drive device described in U.S. Pat. No. 5,070,978 which is incorporated herein by reference. By incorporating many of the features of the one-way drive device disclosed in the U.S. Pat. No. 5,070,978, the present invention provides for a more reliable means of limiting the abrupt movement of each passenger seat as a result of and in response to a sudden cessation in the normal forward movement of the vehicle.

SUMMARY OF THE INVENTION

In accordance with the present invention, the linear one-way movement device disclosed herein is comprised of first and second members including respective first and second linearly extending planar surfaces and means for coupling the first and second members to one another such that the first and second linearly extending planar surfaces are adjacent to and in confronting relationship with one another and such the two members are telescopically moveable relative to one another between contracted and extended positions. The device also includes first means for attaching the first member to either the particular object, for example, the vehicle seat under discussion, or to an anchoring surface that is fixed relative to the abrupt movement of the object as a result of and in response to a sudden cessation in the normal forward movement of the object. Second means are also provided by the device for attaching the second member either to the object, again for example the vehicle seat, or to the anchoring surface, whichever the first member is not attached to, so as to allow the first and second members to telescopically move between their extended and retracted positions in response to and as a result of the abrupt movement of the object caused by, for example, a head-on collision between means, for example, a vehicle carrying a vehicle seat, and another object.

A coupling arrangement also forms part of the overall linear one-way movement device disclosed herein and includes a series of linearly spaced first pockets defining strut-engaging first shoulders in the first linearly extending planar surface of the first member, a series of linearly spaced second pockets defining strut-engaging second shoulders in the second linearly extending planar surface of the second member, and at least one and preferably a plurality of cooperating struts which have opposing shoulder-engaging edges and which are carried by the first linearly extending surface of the first member for allowing the first and second members to telescopically move to the extended position from the contracted position in response to and as a result of the abrupt movement of the object but preventing the members from telescopically moving back to the contracted position.

In accordance with one feature of the present invention, the series of first and second pockets and the strut or struts forming part of the coupling arrangement of the linear one-way movement device are configured such that, in order to prevent the first and second members from telescopically moving back to the contracted position from the extended position, the opposing shoulder-engaging edges of at least one of the struts respectively engage the first and second shoulders of an adjacent pair of first and second pockets in a way which places a compressive load across the strut between its engaging edges. In accordance with another feature of the present invention, each strut is wider than it is thick and each of the opposing edges defines a generally rectangular, parallel, flat surface defined by the thickness and length of the strut. In accordance with still another feature of the present invention, while the series of struts are used, the opposing shoulder-engaging edges of one and only one of the struts respectively engage the first and second shoulders of an adjacent pair of first of second pockets in order to prevent the first and second from telescopically moving back to the contracted position from the extended position.

Also, the present invention contemplates an overall passenger seat assembly which is intended for use in a moving vehicle and which includes the linear one-way movement device described immediately above.

BRIEF DESCRIPTION OF THE DRAWINGS

The features of the Both the linear one-way movement device described above and the passenger seat assembly including the linear one-way movement device will be described in more detail hereinafter in conjunction with the drawings in which;

FIG. 5 is longitudinal-sectional view of the device of FIG. 3, taken generally along line 5—5 in FIG. 3;

FIG. 6 is a diagrammatic illustration of a detail of the device of FIG. 3, taken generally from detail "A" in FIG. 5;

FIG. 7 is a view corresponding to FIG. 6 but slightly modified to illustrate a particular feature of the device of FIG. 3; and FIG. 8 is a diagrammatic illustration of a detail of the device of FIG. 3.

DETAILED DESCRIPTION OF THE EMBODIMENTS

Figure 1:
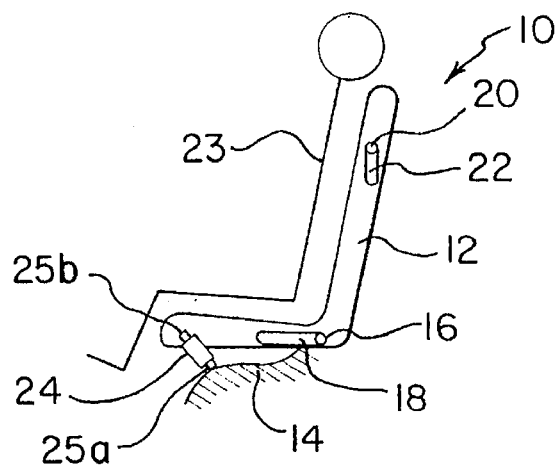
FIG. 1 is a diagrammatic illustration of a vehicle seat which is designed in accordance with the present invention and which is shown in its normal position prior to a head-on collision.
Figure 2:
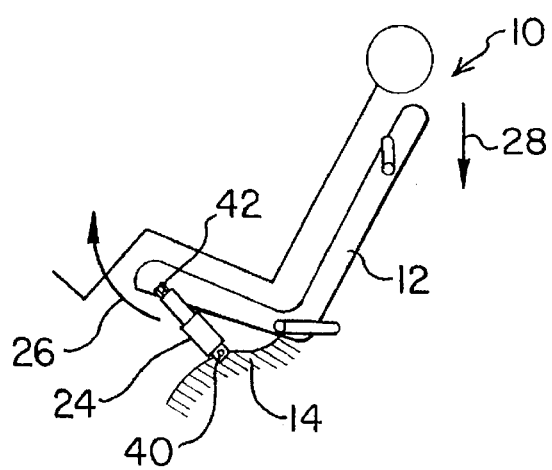
FIG. 2 is a diagrammatic illustration of a vehicle seat shown in FIG. 1 but depicted in this figure in the tilted position as a result of and in response to a sudden cessation in the normal forward movement of the vehicle within which the seat resides.

Turning now to the drawings, wherein like components are designated by like reference numerals throughout the various figures, attention is first directed to FIGS. 1 and 2 which illustrate a seat assembly constructed in accordance with the present invention and generally indicated by the reference numeral 10. The seat assembly forms part of an overall automobile or other such vehicle and includes a seat 12 mounted to the vehicle's chassis 14 for movement between a normal, upright position, as illustrated in FIG. 1, and a tilted position as illustrated in FIG. 2. The seat is supported to the chassis for movement between these two extreme positions and only these two extreme positions by any suitable and readily providable means. In the embodiment illustrated in FIGS. 1 and 2, this is accomplished by means of two pin and slot arrangements. One such arrangement includes a pin 16 fixedly connected to the seat portion of seat 12 and extending into a cooperating slot 18 in the vehicle chassis. The other pin and slot arrangement includes a pin 20 extending out from the back portion of seat 12 and extending into a cooperating slot 22 which is also formed in the vehicle's chassis.

During normal operation of the vehicle, as it moves forward, seat 12 remains in its normal position illustrated in FIG. 1. However, as is well known, should the vehicle suddenly cease its forward movement caused by, for example, a head-on collision with another vehicle or other object, the seat will continue to move forward initially and then will snap back when its reaches the limit of its forward movement. In the case of seat assembly 10, unless compensated for, seat 12 will initially move from its normal FIG. 1 position to its tilted FIG. 2 position in response to a sudden cessation in the normal forward movement of the vehicle and then it will continue to bounce back and forth between these two extreme positions. As indicated previously, rapid back and forth movement can subject the occupant 23 to whiplash. However, in accordance with the present invention, seat assembly 10 includes a specifically configured linear one-way movement device 24 pivotally connected at one end 25a to chassis 14 and at its opposite end 25b to the seat portion of seat 12 for allowing the seat to move from its normal, FIG. 1 position to its tilted FIG. 2 position in response to a sudden cessation in the forward movement of the vehicle but preventing it from snapping back to its normal, FIG. 1 position. That is, once seat 12 initially snaps to its tilted position from its normal position, linear one-way device 12 locks the seat into the tilted back position so as to eliminate continued oscillation of the seat which could possibly subject the occupant to whiplash.

Before describing linear one-way movement device in detail, the specific way in which seat 12 is mounted to chassis 14 should be noted. In particular, as illustrated in FIGS. 1 and 2, in response to the sudden cessation in the forward movement of the vehicle, the previously described pin and slot arrangements cause the seat 12 to move from its normal FIG. 1 position to its tilted FIG. 2 position in an upwardly and forwardly manner. That is, the front of the seat portion of seat 12 moves upwardly and forwardly, as indicated by arrow 26 in FIG. 2 and the back portion of the seat moves downwardly, as indicated by arrow 28 in FIG. 2. This particular type of movement provides a great degree of protection to the occupant, assuming of course, the occupant is properly buckled into his or her seat.

Figure 3:
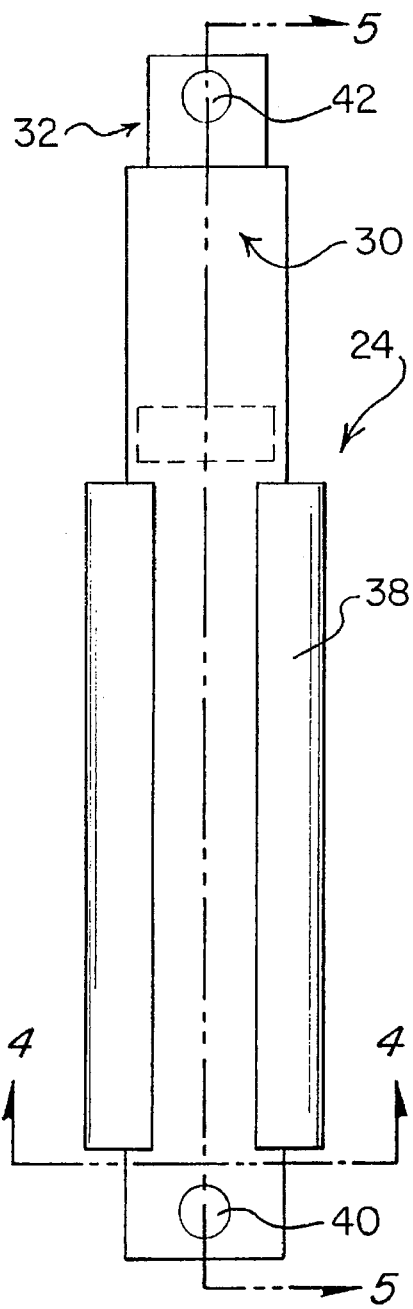
FIG. 3 is a side-elevational view of a linear one-way movement device which is designed in accordance with the present invention and which forms part of the overall vehicle seat assembly illustrated in FIGS. 1 and 2.
Figure 4:
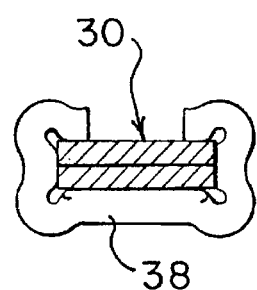
FIG. 4 is a cross-sectional view of the device of FIG. 3, taken generally along line 4—4 in FIG. 3.

Turning now to FIGS. 3–7, attention is directed to the detailed components making up linear one-way movement device 24. As illustrated in FIGS. 3 and 4, this device includes a first longitudinally extending member 30, hereinafter referred to as a pocket plate, and a second longitudinally extending member 32, hereinafter referred to as a notch plate, As best illustrated in FIG. 5, pocket plate 30 includes a pocket defining, linearly extending planar surface 34 and notch plate 32 includes a notch defining, linearly extending planar surface 36. A longitudinally, generally C-shaped coupling member 38 is fixedly connected to the underside of notch plate 32 and, as best seen in FIG. 4, wraps around pocket plate 30 such that the linearly extending planar surfaces 34 and 36 are adjacent to and in confronting relationship with one another and such that the pocket plate and slide plate are telescopically moveable relative to one another between the contracted position illustrated in FIGS. 3 and 5 and an extended position which is limited by the movement of seat 12, as will be seen hereinafter. In this regard, one end of pocket plate 30 includes suitable means, for example aperture 40 which accommodates a cooperating fastening member for pivotally connecting that end of the pocket member to chassis 14 (see FIGS. 1 and 2). The opposite end of the slide plate 32 includes an aperture 42 or other such suitable means for accommodating a cooperating means for pivotally connecting that end of the slide plate to the seat portion of seat 12. In that way, when seat 12 is caused to move from its normal, FIG. 1 position, to its tilted, FIG. 2 position, as described previously, the pocket and slide plates will move from the contracted position shown in FIGS. 3 and 5 and in FIG. 1 to the extended position shown in FIG. 2. As will be seen below, once the pocket and slide plates move to the extended position, means are provided to prevent them from moving back to the contracted position which, in turn, prevents seat 12 from moving back to its normal, FIG. 1 position, as is the intended function of the device. The coupling arrangement forming part of the overall device to accomplish this will be described immediately below.

Referring specifically to FIGS. 5–7 in conjunction with FIGS. 3 and 4, the coupling arrangement recited immediately above will now be described. This arrangement includes a series of linearly spaced pockets 44 in the linearly extending planar surface 34 of pocket plate 30, each pocket 44 including a strut-engaging shoulder 46 and a series of linearly spaced pockets or notches 48 in the linearly extending planar surface 36 of notch plate 32, each pocket or notch 48 including a strut-engaging shoulder 50, as best illustrated in FIG. 6. The coupling arrangement also includes a plurality of struts 52, one for each of the pockets 44 in pocket plate 30. These struts will be described in more detail hereinafter. For the moment, it suffices to say that each strut includes opposing shoulder-engaging edges 54 and 56 designed to engage against shoulders 46 and 50 of pockets 44 and 48, respectively, in order to prevent the pocket and notch plates from moving back to the contracted position after they have initially moved to the extended position, as will be seen.

Still referring to FIG. 6, each of the struts 52 is shown positioned within an associated pocket 44 and is supported within the pocket for movement between a first position entirely within the pocket (see FIG. 8) and a second position extending partially out of the pocket, as shown in FIGS. 6 and 7. When the strut is in it first position entirely within an associated pocket 44, its shoulder-engaging edge 50 also resides entirely within the pocket, thereby allowing the pocket and slide plates to move relative to one another in the directions of arrows 58 and 60, that is, toward the extended position. With the strut in its second position partially outside of pocket 44, it is able to extend into pocket 48 such that one edge 54 engages shoulder 46 of pocket 44 while the opposing edge 56 engages shoulder 50 of pocket 48. This prevents the pocket and slide plates from moving relative to one another in directions opposite arrows 58 and 60, that is, toward the contracted position (when the plates are in the extended position).

In addition to the components thus far described, the overall coupling arrangement includes suitable means for biasing each strut in the position illustrated in FIG. 6. In the particular embodiment illustrated, the biasing means associated with each strut 52 includes a spring 62 disposed partially within the counter bore 64 and its associated pocket 44 directly beneath and in engagement with a cooperating strut so as to force the latter outward in the manner shown. For reasons to be described below, each pocket or notch 48 includes a ramp 66 which also forms part of the overall coupling arrangement.

Turning specifically to FIG. 5 in conjunction with FIG. 6, attention is now directed to the way in which the coupling arrangement just described allows seat 12 to initially move from its normal, FIG. 1 position to its tilted, FIG. 2 position in response to a sudden cessation in the forward movement of the vehicle while at the same time preventing the seat from snapping back to its FIG. 1 position from its FIG. 2 position. In this regard, with seat 12 in its FIG. 1 position, the pocket and slide plates are in their contracted position. As the seat moves to its tilted, FIG. 2 position, the pocket and slide plates telescopically move to the extended position in the direction of arrows 58 and 60. In so doing, the ramps 66 forming part of each of the pockets or notches 48 engage the struts 52 in a way which maintains the struts entirely within their associated pockets, thereby allowing the plates to telescopically slide relative to one another. Once seat 12 reaches its fully tilted position and attempts to snap back to its normal position, the pocket and notch plates and their cooperating coupling arrangement prevent the seat from doing so by locking in their extended position. Specifically, as the two plates attempt to slide back to their contracted position (in the directions opposite arrows 58 and 60), one of the struts 52 is forced outwardly into one of the notches or pockets 48 such that its opposing edges 54 and 56 engage respective shoulder-engaging surfaces 46 and 50, thereby preventing the plates from contracting. As the pocket and notch plates attempt to do so in response to the forces on seat 12 as it tries to snap back to its FIG. 1 position, the opposing shoulder engaging edges 54 and 56 engage the cooperating shoulders 46 and 50 in a way which places a compressive load across the strut between the opposing edges.

With particular reference to FIG. 7, note specifically that edge 56 defines an acute angle x with the widthwise axis of strut 52, as opposed to being 90° therewith. At the same time, its engaging-shoulder 50 is perpendicular to its planar surface 36. This angle x is the "attack angle," in which the strut engages shoulder 50 in order to lock the pocket and slide plates together when they attempt to contract from their extended position. If the attack angle x were 90°, which would not be possible, the maximum locking force that could be achieved would be 100% of the compressive force on the strut. As it is, in the embodiment illustrated, the angle x is 77°. At this attach angle, 97.4% of the compressive force on the strut is used to lock the plates together.

Still referring to FIG. 7, it should be noted that strut 52 pivots from its extreme non-engaging position entirely within pocket 44 to its extreme coupled in engagement with shoulder 50 through an angle y. Because the strut is long (in the direction of the paper, as viewed in FIG. 7 and see FIG. 8) and thin (across the paper in FIG. 7) and not as wide as it is long (see FIG. 8), this angle can be relatively small. In the embodiment illustrated, the strut pivots through an angle of only 13° which means that it can move from its extreme non-engaging position to its extreme engaging position faster than it could otherwise do so if it had to move through a greater angle. This, in turn, allows the coupling arrangement to lock the pocket and notch plates very quickly after they move to their extended position and attempt to move back to the contracted position. In the particular embodiment illustrated in the figures, overall linear one-way movement device 24 is shown including 11 pockets or notches 48 in notch plate 32 and only 2 pockets 48 in pocket plate 30 and only two associated struts 52. It is to be understood that the present invention is not limited to this particular configuration of pockets and struts. There could be more or less notches or pockets 48 and there could be a single pocket 64 and associated strut 52 or more than two. In a preferred embodiment, there are more notches or pockets 48 than there are struts 52 and associated pockets 64. In a most preferred embodiment, the number of each is selected such that the two numbers do not have a common denominator. As a result, at any instant in time, as the pocket and notch plates attempt to contract from the extended position, one and only one strut can be in precise alignment with a cooperation pockets 48. As a result, only one of the struts will lock the two plates in place.

As indicated previously, linear one-way movement device 12 has been modeled after the one-way drive device described in U.S. Pat. No. 5,070,978 which has been incorporated herein by reference. Many of the features described in the Patent are applicable to the present invention. For example, the particular struts described in the present application and the way they are held within their cooperating pockets can be replaced with the struts and cooperating support arrangement described in the Patent. It is also to be understood that the present invention is not limited to the particular way in which seat 12 is supported between its two extreme positions, nor is the present invention limited to the particular way in which device 24 is coupled to seat 12 and chassis 14. In the particular embodiment illustrated, the pocket plate is described coupled to the chassis and the notch plate is described coupled to the seat. This obviously can be reversed.

Finally, a shear pin 70 can be positioned within cooperating holes in plates 30 and 32 as shown in FIG. 5 to insure that device 24 remains locked in it's contracted position and does not inadvertently move to it's extended position under normal start and stop situations. The shear pin would be readily designed to break away under the desired conditions. The shear pin or the suitable means could be provided as part of the seat assembly and not device 24, in which case, once activated, device 24 could be removed and replaced or reset by disassembling it. Reset openings such as the opening 72 could be provided above each pocket 48 so that a cooperating pin could be used to force down the struts. This would be tedious but possible.

What is claimed is:

1. A linear one way drive device for use in limiting the abrupt movement of an object as a result of and in response to a sudden cessation in the forward movement of the object caused by a head-on collision between means carrying that object and another object, said device comprising:
   (a) first and second members including first and second linearly extending planar surfaces, respectively;
   (b) means for coupling said first and second members to one another such that said first and second linearly extending planer surfaces are adjacent to and in confronting relationship with one another and such that said members are telescopically movable relative to one another between contracted and extended positions;
   (c) first means for attaching the first member to either said object or to an anchoring surface that is on said carrying means and that is fixed relative to the abrupt movement of the object as a result of and in response to a sudden cessation in the normal forward movement of the object and second means for attaching the second member either to said object or to said anchoring surface, which ever the first member is not attached to, so as to allow said first and second members to telescopically move between their extended and retracted positions in response to and as a result of the abrupt movement of said object;
   (d) a coupling arrangement including a series of linearly spaced first pockets defining strut engaging first shoulders in the first linearly extending planar surface of said first member, a series of linearly spaced second pockets defining strut engaging second shoulders in the second linearly extending planar surface of said second member, and a plurality of cooperating struts having shoulder engaging edges and carried by the first linearly extending surface of said first member for allowing said first and second members to telescopically move to said extended position from said contracted position in response to and as a result of the abrupt movement of said object but preventing said members from telescopically moving back to said contracted position, said series of first and second pockets and said struts being configured such that, in order to prevent said first and second members from telescopically moving back to said contracted position from said extended position, the shoulder engaging edges of at least one of said struts respectively engage the first and second shoulders of an adjacent pair of first and second pockets in a way which places a compressive load across that strut between its engaging edges.

2. A device according to claim 1 wherein said struts are configured such that, in order to prevent said first and second members from telescopically moving back to said contracted position from said extended position, the shoulder engaging edges of one and only one of said struts respectively engage the first and second shoulders of an adjacent pair of first and second pockets.

3. A device according to claim 2 wherein said coupling arrangement includes means for connecting each of said struts to the linearly extending surface of said first member for movement between a first biased position in engagement with the strut engaging second shoulders of the second member and a second position out of engagement with said second shoulders, said struts and their respective connecting means being configured such that the compressive load placed across said one strut to prevent said first and second members from telescopically moving back to said contracted position from said extended position is taken up substantially entirely by said first and second members and said one strut and not by the one strut's connecting means.

4. A device according to claim 1 wherein the coupling arrangement includes a greater number of pockets than struts.

5. A device according to claim 1 wherein each of said first and second attaching means is pivotally attached to its respective object or anchoring surface.

6. A device according to claim 1 wherein each of said struts is wider than it is thick and each of said opposing edges is a generally rectangular, parallel, flat surface defined by the thickness and length of the strut.

7. A device according to claim 6 wherein said strut is longer than it is wide.

8. A device according to claim 7 wherein said coupling arrangement includes means for connecting each of said struts to the linearly extending surface of said first member for movement between a first biased position in engagement with the strut engaging second shoulders of the second member and a second position out of engagement with said second shoulders, said struts and their respective connecting means being configured such that the compressive load placed across said one strut to prevent said first and second members from telescopically moving back to said contracted position from said extended position is taken up substantially entirely by said first and second members and said one strut and not by the one strut's connecting means.

9. A device according to claim 8 wherein each of said connecting means supports its strut for pivotal movement between its first and second positions about an axis through the strut parallel with its shoulder engaging edges such that the strut pivots about 13 degrees between its first and second positions.

10. A passenger seat assembly for use in a moving vehicle, comprising:
   (a) a seat;
   (b) a arrangement connecting said seat to the chassis of said vehicle for movement along a predetermined path as a result of and in response to a sudden cessation in the forward movement of the vehicle caused by a head-on collision between the vehicle and another object, said arrangement including
      (i) first and second members including first and second linearly extending planar surfaces, respectively;
      (ii) means for coupling said first and second members to one another such that said first and second linearly extending planar surfaces are adjacent to and in confronting relationship with one another and such that said members are telescopically movable relative to one another between contracted and extended positions;
      (iii) first means for attaching the first member to either said seat or to an anchoring surface on the chassis of the vehicle and second means for attaching the second member either to said seat or to said anchoring surface, which ever the first member is not attached to, so as to allow said first and second members to telescopically move between their extended and retracted positions in response to and as a result of the abrupt movement of said seat;
   (d) a coupling arrangement including a series of linearly spaced first pockets defining strut engaging first shoulders in the first linearly extending planar surface of said first member, a series of linearly spaced second pockets defining strut engaging second shoulders in the second linearly extending planar surface of said second member, and a plurality of cooperating struts having shoulder engaging edges and carried by the first linearly extending surface of said first member for allowing said first and second members to telescopically move to said extended position from said contracted position in response to and as a result of the abrupt movement of said seat but preventing said members from telescopically moving back to said contracted position, said series of first and second pockets and said struts being configured such that, in order to prevent said first and second members from telescopically moving back to said contracted position from said extended position, the shoulder engaging edges of at least one of said struts respectively engage the first and second shoulders of an adjacent pair of first and second pockets in a way which places a compressive load across that strut between its engaging edges.

11. A assembly according to claim 10 wherein said struts are configured such that, in order to prevent said first and second members from telescopically moving back to said contracted position from said extended position, the shoulder engaging edges of one and only one of said struts respectively engage the first and second shoulders of an adjacent pair of first and second pockets.

12. An assembly according to claim 11 wherein said coupling arrangement includes means for connecting each of said struts to the linearly extending surface of said first member for movement between a first biased position in engagement with the strut engaging second shoulders of the second member and a second position out of engagement with said second shoulders, said struts and their respective connecting means being configured such that the compressive load placed across said one strut to prevent said first and second members from telescopically moving back to said contracted position from said extended position is taken up substantially entirely by said first and second members and said one strut and not by the one strut's connecting means.

13. An assembly according to claim 10 wherein the coupling arrangement includes a greater number of pockets than struts.

14. An assembly according to claim 10 wherein each of said first and second attaching means is pivotally attached to its respective seat or anchoring surface.

15. An assembly according to claim 10 wherein each of said struts is wider than it is thick and each of said opposing edges is a generally rectangular, parallel, flat surface defined by the thickness and length of the strut.

16. An assembly according to claim 15 wherein said strut is longer than it is wide.

17. An assembly according to claim 16 wherein said coupling arrangement includes means for connecting each of said struts to the linearly extending surface of said first member for movement between a first biased position in engagement with the strut engaging second shoulders of the second member and a second position out of engagement with said second shoulders, said struts and their respective connecting means being configured such that the compressive load placed across said one strut to prevent said first and second members from telescopically moving back to said contracted position from said extended position is taken up substantially entirely by said first and second members and said one strut and not by the one strut's connecting means.

18. An assembly according to claim 17 wherein each of said connecting means supports its strut for pivotal movement between its first and second positions about an axis through the strut parallel with its shoulder engaging edges such that the strut pivots about 13 degrees between its first and second positions.

19. An assembly according to claim 10 wherein said path is an accurate path along which said seat moves as a result of and in response to a sudden cessation in the forward movement of the vehicle caused by, for example, a head-on collision between the vehicle and another object.

* * * * *